(12) United States Patent
Powell et al.

(10) Patent No.: US 10,036,278 B2
(45) Date of Patent: Jul. 31, 2018

(54) HIGH PRESSURE COMPRESSOR THERMAL SHIELD APPARATUS AND SYSTEM

(71) Applicant: United Technologies Corporation, Hartford, CT (US)

(72) Inventors: Brad Powell, Guilford, CT (US); Chong H. Park, Ivoryton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 277 days.

(21) Appl. No.: 14/665,797

(22) Filed: Mar. 23, 2015

(65) Prior Publication Data
US 2015/0292353 A1   Oct. 15, 2015

Related U.S. Application Data

(60) Provisional application No. 61/978,637, filed on Apr. 11, 2014.

(51) Int. Cl.
| | | |
|---|---|---|
| *F01D 11/02* | (2006.01) | |
| *F01D 25/12* | (2006.01) | |
| *F01D 25/14* | (2006.01) | |
| *F01D 5/08* | (2006.01) | |
| *F01D 11/00* | (2006.01) | |

(Continued)

(52) U.S. Cl.
CPC ............ *F01D 25/12* (2013.01); *F01D 1/02* (2013.01); *F01D 5/06* (2013.01); *F01D 5/084* (2013.01); *F01D 11/001* (2013.01); *F01D 11/02* (2013.01); *F01D 25/145* (2013.01); *F02C 7/24* (2013.01); *F05D 2220/32* (2013.01); *F05D 2220/3219* (2013.01); *F05D 2240/12* (2013.01); *F05D 2240/15* (2013.01); *F05D 2240/24* (2013.01); *F05D 2260/231* (2013.01);

(Continued)

(58) Field of Classification Search
CPC ... F01D 25/12; F01D 1/02; F01D 5/06; F01D 5/066; F01D 11/02; F01D 11/025; F01D 11/04; F01D 11/001; F01D 5/084; F01D 25/145; F02C 7/24; F05D 2260/231; F05D 2220/3219; F05D 2240/15
USPC ............ 415/173.7, 174.4, 174.5; 416/198 A, 416/200 A, 201 R
See application file for complete search history.

(56) References Cited

U.S. PATENT DOCUMENTS

| | | | |
|---|---|---|---|
| 3,056,579 A | | 10/1962 | Melvin |
| 4,277,225 A | * | 7/1981 | Dubois ..................... F01D 5/06 |
| | | | 416/193 A |

(Continued)

FOREIGN PATENT DOCUMENTS

EP            1079070           2/2001

OTHER PUBLICATIONS

English machine translation of EP 1 079 070, Feb. 2001.*
Extended European Search Report dated Aug. 31, 2015 in European Application No. 15163327.8.

*Primary Examiner* — Christopher Verdier
(74) *Attorney, Agent, or Firm* — Snell & Wilmer, L.L.P.

(57) ABSTRACT

In various embodiments, a high pressure compressor may comprise a thermal shield. The thermal shield may be installed between a first rotor and a second rotor. The thermal shield may also be installed radially inward of a stator. The stator may be a shrouded stator. Moreover, the (Continued)

thermal shield may be configured to thermally isolate and/or reduce the thermal load associated with windage on a rotor hub.

16 Claims, 10 Drawing Sheets

(51) Int. Cl.
  *F02C 7/24* (2006.01)
  *F01D 1/02* (2006.01)
  *F01D 5/06* (2006.01)
(52) U.S. Cl.
  CPC ......... *F05D 2260/31* (2013.01); *Y02T 50/671* (2013.01); *Y02T 50/676* (2013.01)

(56) References Cited

U.S. PATENT DOCUMENTS

| | | | | |
|---|---|---|---|---|
| 5,833,244 A | * | 11/1998 | Salt | F01D 11/001 277/418 |
| 5,842,831 A | * | 12/1998 | Galke | F01D 5/08 416/198 A |
| 7,476,078 B2 | * | 1/2009 | Doebbeling | F01D 5/08 415/115 |
| 2002/0187046 A1 | | 12/2002 | Beutin et al. | |
| 2003/0133803 A1 | * | 7/2003 | Brault | F01D 5/066 416/204 R |
| 2007/0235946 A9 | | 10/2007 | Garrison et al. | |
| 2008/0008582 A1 | * | 1/2008 | Pickens | F01D 11/001 415/174.2 |
| 2008/0050233 A1 | * | 2/2008 | Steiger | F01D 11/001 415/230 |
| 2009/0081027 A1 | * | 3/2009 | Khanin | F01D 11/001 415/170.1 |
| 2010/0172761 A1 | * | 7/2010 | Le Goff | B23K 15/0053 416/198 A |
| 2010/0290898 A1 | * | 11/2010 | McCaffrey | F01D 11/001 415/173.7 |
| 2012/0027584 A1 | * | 2/2012 | Cummins | F01D 11/003 415/230 |
| 2013/0064673 A1 | * | 3/2013 | Domercq | F04D 29/321 416/223 R |

* cited by examiner

HIGH PRESSURE COMPRESSOR THERMAL SHIELD APPARATUS AND SYSTEM

CROSS-REFERENCE TO RELATED APPLICATIONS

This application is a nonprovisional of, and claims priority to, and the benefit of U.S. Provisional Application No. 61/978,637, entitled "HIGH PRESSURE COMPRESSOR THERMAL SHIELD APPARATUS AND SYSTEM," filed on Apr. 11, 2014, which is hereby incorporated by reference in its entirety.

FIELD

The present disclosure relates to thermal protection system for high pressure compressor components, and, more specifically, to a thermal shield configured to conduct cooling airflow through one or more portions of a high pressure compressor.

BACKGROUND

Modern turbofan engines have a modular design architecture consisting of the "cold section" and "hot section." Air drawn in to the engine undergoes an increase in pressure through the cold section, followed by a decrease in pressure through the hot section as work is extracted from the compressed air. Typically, the air temperature increases through each stage of the engine.

SUMMARY

In various embodiments, a thermal shield may comprise a body portion, a retention mechanism and a first knife seal. The retention mechanism may be integrally formed in the body portion. The first knife seal may be integrally formed in the body portion.

In various embodiments, a high pressure compressor may comprise a rotor hub, a first rotor, a stator, a second rotor and a thermal shield. The first rotor may be coupled to the rotor hub. The stator may be installed adjacent to and aft the first rotor. The second rotor may be installed adjacent to and aft the stator. The second rotor may be coupled to the rotor hub. The thermal shield may be coupled to the rotor hub. The thermal shield may be disposed radially inward of the stator. The thermal shield may also comprise one or more seals including, for example, one or more knife seals.

In various embodiments, a gas turbine engine may comprise a high pressure turbine, a combustor and a high pressure compressor. The combustor may be configured to drive the high pressure turbine. The high pressure compressor may be operatively coupled to the high pressure turbine. The high pressure compressor may be capable of being driven by the high pressure turbine. The high pressure compressor may comprise a rotor hub, a first rotor, a second rotor, and a thermal shield. The first rotor may be coupled to the rotor hub. The second rotor may be installed adjacent and aft the first rotor. The thermal shield may be coupled to the rotor hub and disposed between the first rotor and the second rotor. The thermal shield may comprise one or more seals, including, at least a first seal and the second seal. The first seal may be, for example, a first knife seal and the second seal may be, for example, a second knife seal.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step.

Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
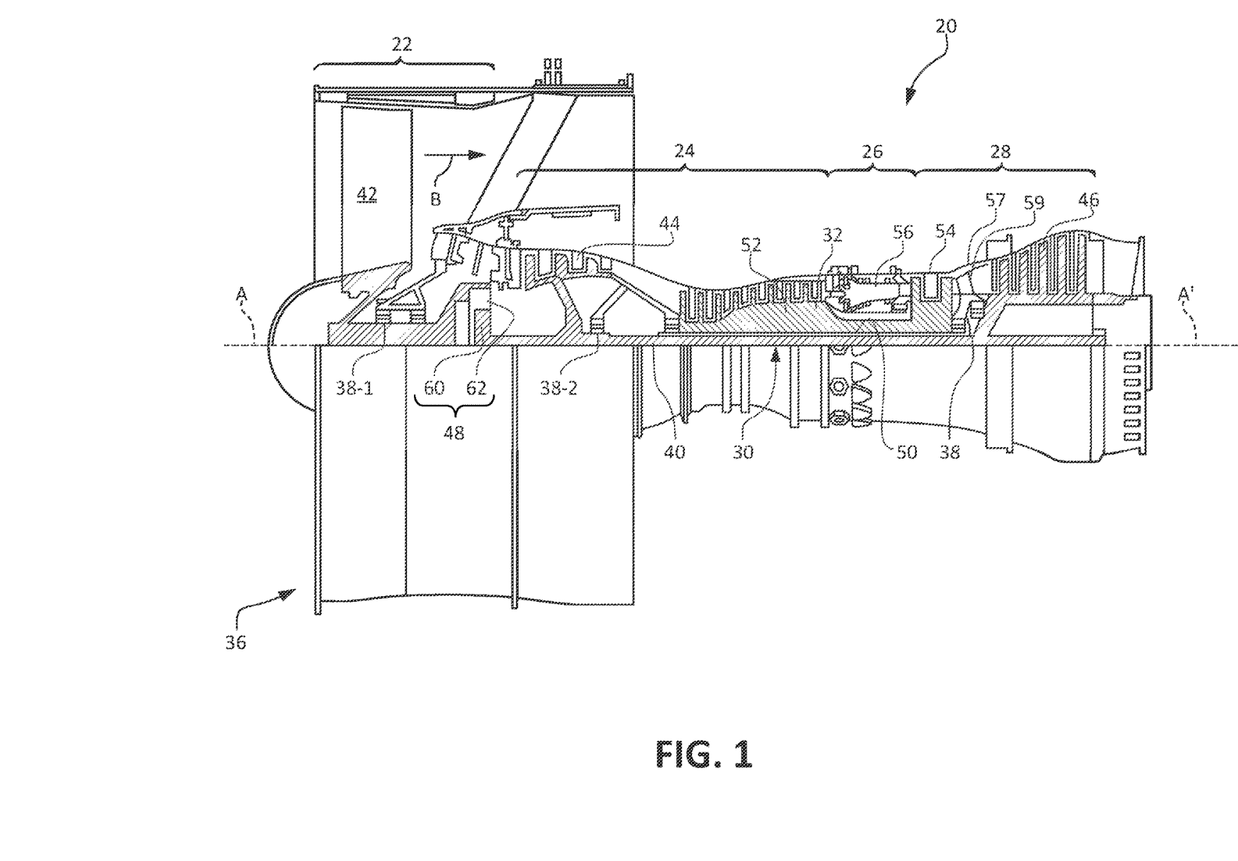
FIG. 1 illustrates cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive air along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2 in FIG. 1). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about 5:1. Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which requires higher pressure ratios and higher temperatures in the HPC 52. These higher operating temperatures and pressure ratios may create operating environments that may cause thermal loads that are higher than the thermal loads which may shorten the endurance life of current components.

Figure 2:
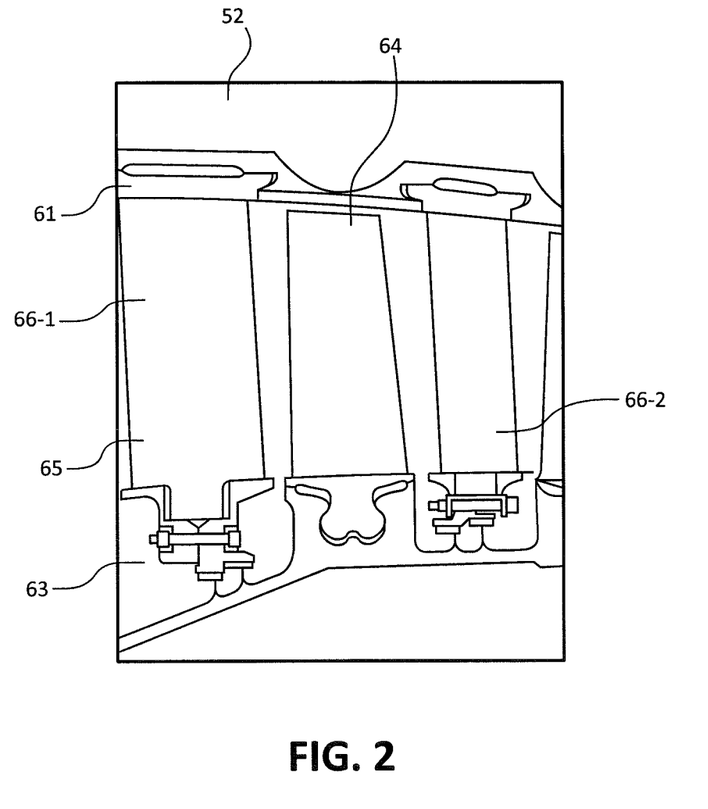
FIG. 2 illustrates a cross-sectional view of a portion of a high pressure compressor comprising a shrouded stator, in accordance with various embodiments.

In various embodiments and with reference to FIG. 2, HPC 52 may comprise alternating rows of rotating rotors 64 and stationary stators 66 (shown as stator 66-1 and stator 66-2 in FIG. 2). Stators may have a cantilevered configuration or a shrouded configuration. Stators 66 have a shrouded configuration as shown in FIG. 2. More specifically, stator 66 may comprise a stator vane 65, a casing support 61 and a hub support. In this regard, stator vane 65 may be supported along an outer diameter by casing support 61 and along an inner diameter hub support. In contrast, a cantilevered stator may comprise a stator vane that is only retained and/or supported at the casing (e.g., an outer diameter).

In various embodiments, rotors 64 may be configured to compress and spin fluid flow (e.g., core flow C as discussed with reference to FIG. 1). Stators 66 may be configured to receive and straighten the fluid flow (e.g., core flow C). In operation, the fluid flow discharged from the trailing edge of stators 66 may be straightened (e.g., the flow may be directed in a substantially parallel path to the centerline of the engine and/or HPC) to increase and/or improve the efficiency of the engine and, more specifically, to achieve maximum compression and efficiency when the straightened air is compressed and spun by rotor 64.

Figure 3:
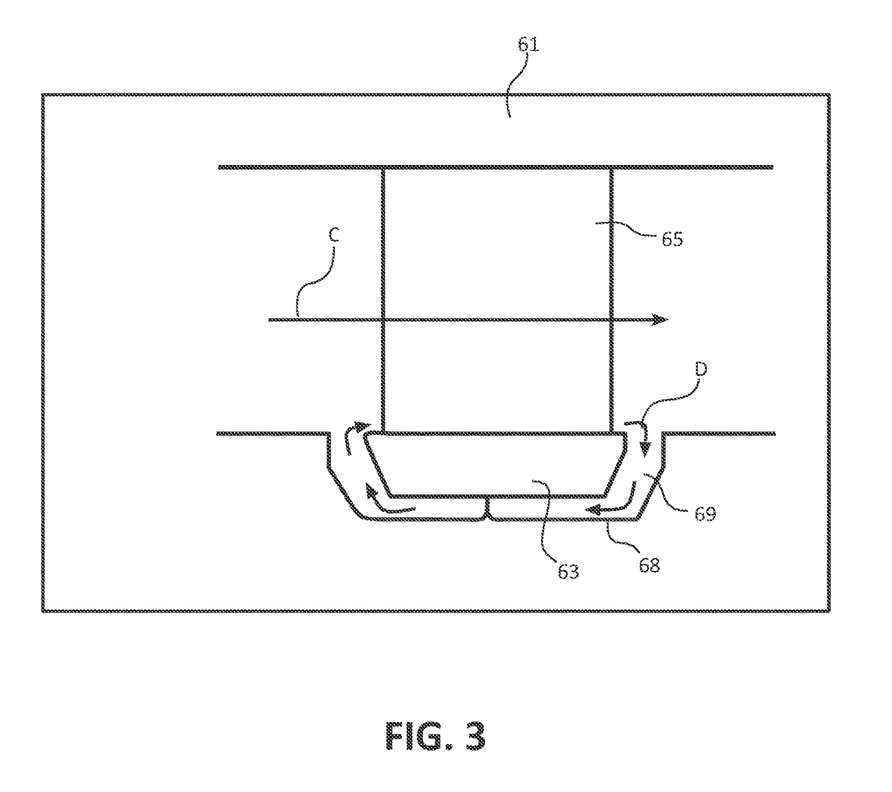
FIG. 3 is a schematic showing fluid flow around a shrouded stator, in accordance with various embodiments.

In various embodiments and with reference to FIG. 3, operating conditions in the aft stages of HPC 52 may be approximately 1400° F. (approximately 760° C.) or more. This increase in core temperature and core flow C may cause the temperature at stator shroud 63 to increase to a temperature that may be higher than the temperature of core flow C. The temperature increase may be caused by windage. Windage may be the frictional force between two objects caused by the relative motion between the two objects (e.g., the friction caused between the spinning air and the stationary shroud).

In various embodiments, windage can cause an increase in the temperature of shroud 63 of approximately 100° F. (approximately 38° C.) or more. As a result, windage may cause temperatures in shroud 63 to be approximately 1500° F. (approximately 816° C.) or more. This operating environment may exceed the temperature limit for materials used for HPC components and/or reduce the endurance life of HPC components.

In various embodiments and with reference to FIG. 3, core flow C may be straightened by stator 66. The straightened core flow C may be drawn into cavity 69 aft of stator 66 as shroud flow D. Shroud flow D may be "re-spun-up" as shroud flow D moves forward in channel 69 defined between a cavity wall 68 and shroud 63. Shroud flow D may cause windage along cavity wall 68 and/or shroud 63. Shroud flow D may also cause the pressure and/or temperature in channel 69 to increase. In this regard, shroud flow D may be temporarily trapped in channel 69 for a period of time leading to further increases in pressure and temperature. Moreover, shroud flow D may be ingested back into the main air stream at a forward portion of channel 69, which may create an efficiency penalty.

Figure 4:
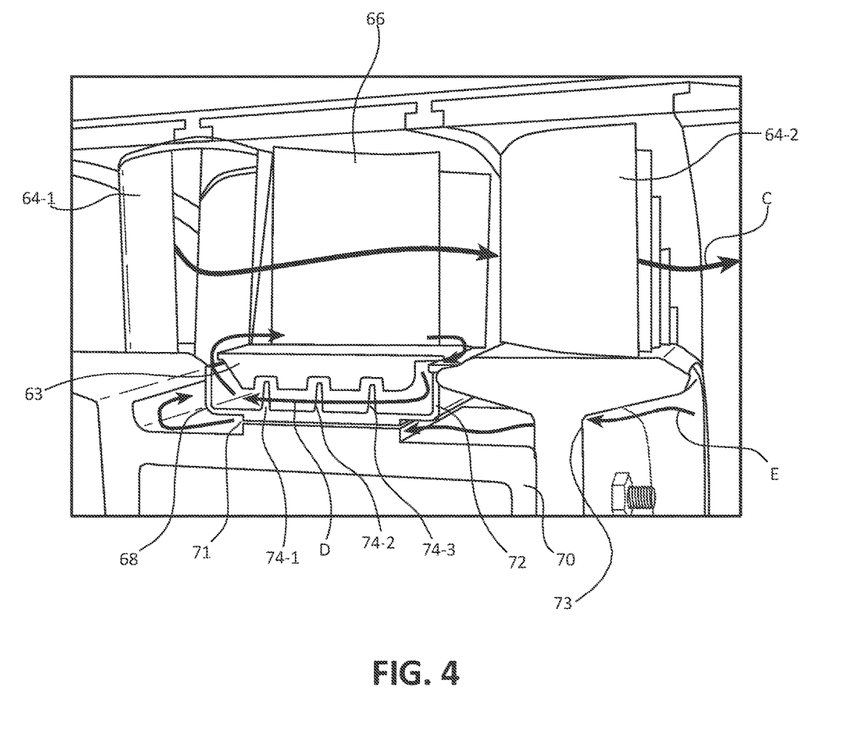
FIG. 4 illustrates a perspective cross-sectional view of a portion of a high pressure compressor comprising a thermal shield, in accordance with various embodiments.

In various embodiments and with reference to FIG. 4, HPC 52 may comprise a thermal shield 72. Thermal shield 72 may be configured to isolate the shroud flow D from a rotor hub 70. In this regard, thermal shield 72 may define a portion of channel 69. Moreover, thermal shield may include and/or define cavity wall 68. Thermal shield 72 may also comprise one or more knife seals 74 (shown as first knife seal-1, second knife seal 74-2, and third knife seal 74-3 in FIG. 4). Knife seals 74 may be formed in thermal shield 72 (e.g. the body of thermal shield 72). Moreover, knife seals 74 may contact and/or otherwise minimize the flow past shroud 63 of stator 66. For example, an edge of knife seal 74 may be configured to contact a surface of shroud 63 to create a seal.

In various embodiments, thermal shield 72 may couple to a first rotor 64-1 and second rotor 64-2. Rotor hub 70 may comprise one or more cooling passages 73 that are configured to conduct a cooling flow E from an aft portion of the HPC to a forward portion of the HPC. Thermal shield 72 may be configured to define a cooling flow channel 71. Cooling flow channel 71 may be defined between cavity wall 68 and rotor hub 70. Moreover, cooling flow channel 71 may be in fluid communication with one or more cooling passages 73. In this regard, cooling flow channel 71 may be configured to create an insulating fluid layer (e.g., cooling flow E) between rotor hub 70 and thermal shield 72—shroud flow D. In this regard, cooling flow channel 71 and/or cooling flow E may thermally isolate thermal shield 72—shroud flow D from rotor hub 70. In this regard, the thermal isolation and/or reduced thermal load created by thermal shield 72 may allow for a reduced size of channel 69, reduced mass of rotor hub 70, reduced temperature gradients in rotor hub 70.

Figure 5:
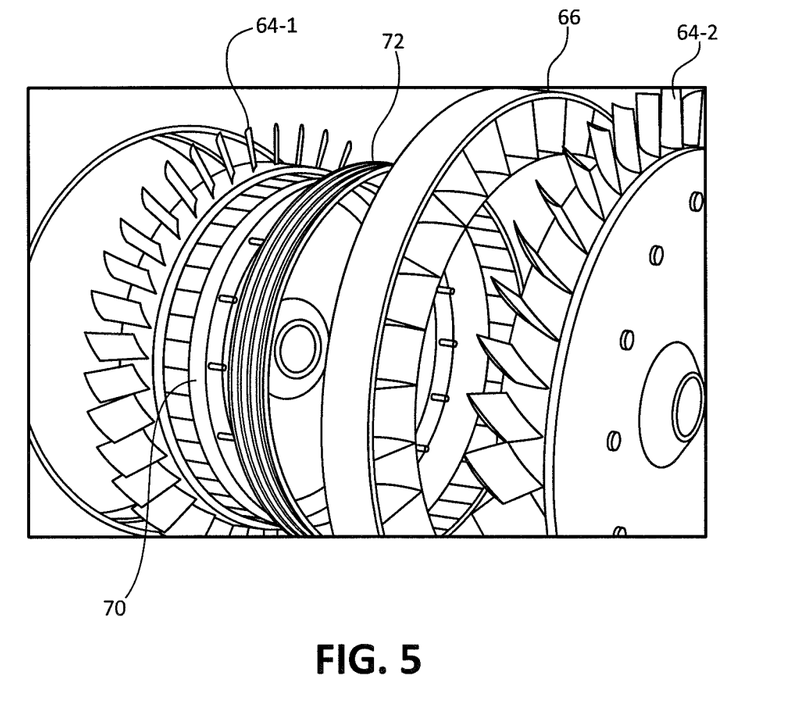
FIG. 5 illustrates an exploded perspective view of a portion of a high pressure compressor comprising a thermal shield, in accordance with various embodiments.

In various embodiments and with reference to FIG. 5, thermal shield 72 may be a continuous ring. Thermal shield 72 may be installed between and coupled to a first rotor 64-1 and a second rotor 64-2 in an axial manner similar to conventional rotor stack assembly techniques. Thermal shield 72 may be integral with the rotor assembly, allowing for traditional assembly such as the split case design with integral shrouded stators. In this regard, thermal shield 72 may be adapted to existing HPC configurations.

In various embodiments, thermal shield 72 may be retained to first rotor 64-1 and second rotor 64-2 in a number of different ways. For example, rotor hub 70 may comprise a suitable retention mechanism such as, for example, at least one of a dovetail retention mechanism and an interlocking arm retention mechanism. For example, retention mechanism may comprise one or more dovetail grooves 76 (shown as dovetail groove 76-1, dovetail groove 76-2, dovetail groove 76-3, and dovetail groove 76-4 in FIGS. 6A and 6B) disposed about an outer diameter of rotor hub 70. Thermal shield 72 may comprise one or more dovetail tabs 78 (shown as dovetail tab 78-1, dovetail tab 78-2, dovetail tab 78-3, and dovetail tab 78-4 in FIGS. 6A and 6B) disposed about an inner diameter of thermal shield 72. In this regard, dovetail tabs 78 may be formed in the body of thermal shield 72. The dovetail tab 78 to dovetail groove 76 retention mechanism may define a dovetail union 79.

Figure 6A:
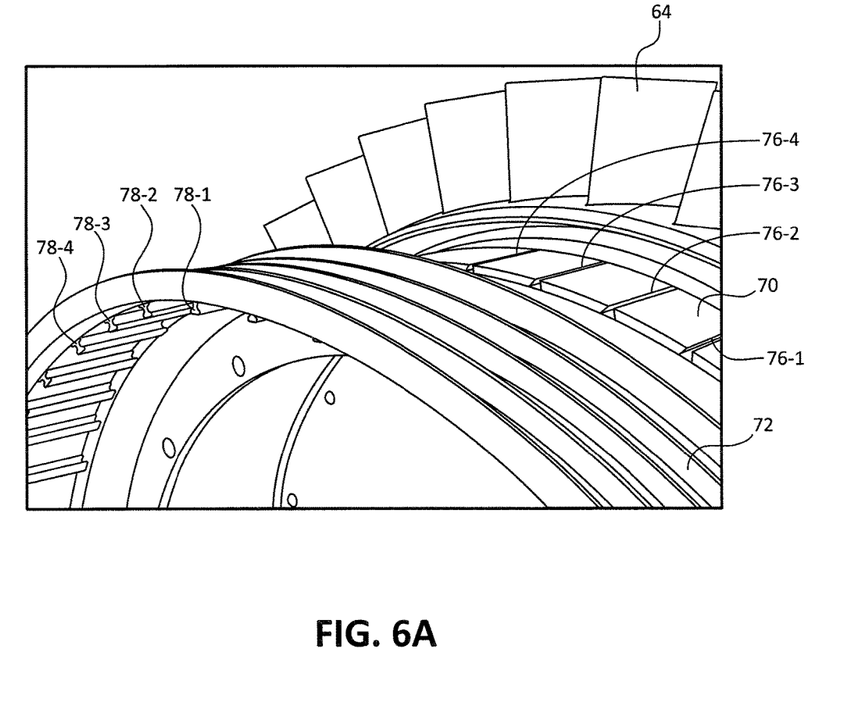
FIGS. 6A-6B illustrate a portion of a high pressure compressor comprising a thermal shield having a dovetail union, in accordance with various embodiments.
Figure 6B:
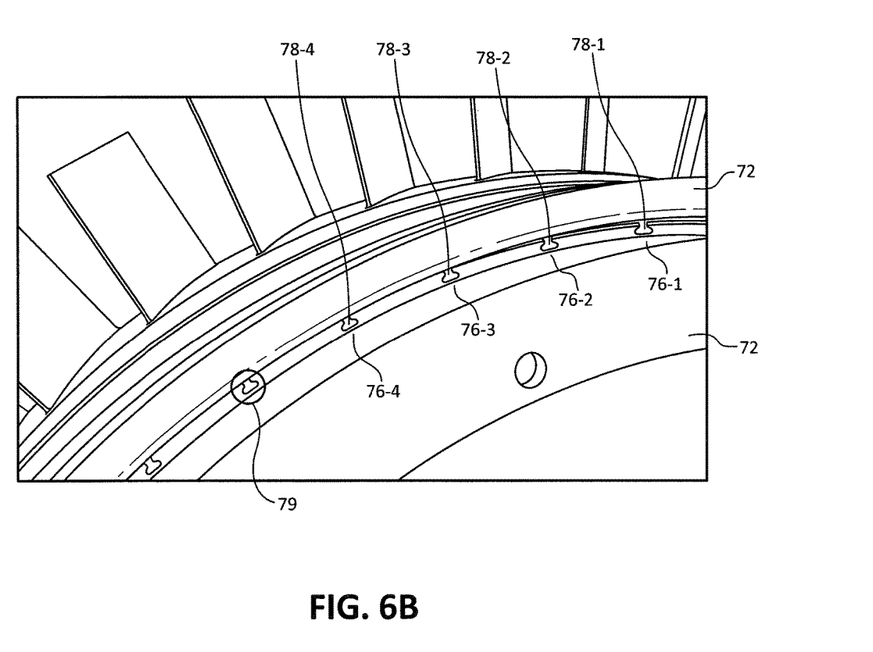

Dovetail union 79 may sufficiently retain and support thermal shield 72. Thermal shield 72 and/or dovetail union 79 may only be required to bear and/or support the dynamic load and/or dynamic hoop stress of thermal shield 72 as it rotates. In this regard, thermal shield 72 may be made in a lightweight manner since it is not required to absorb any loads other than its own dynamic hoop stresses (e.g., the load as thermal shield 72 rotates). Dovetail union 79 may also provide an overall net reduction in weight of the HPC. More specifically, thermal shield 72 may reduce the thermal load on rotor hub 70 allowing rotor hub 70 to be lighter.

Figure 7A:
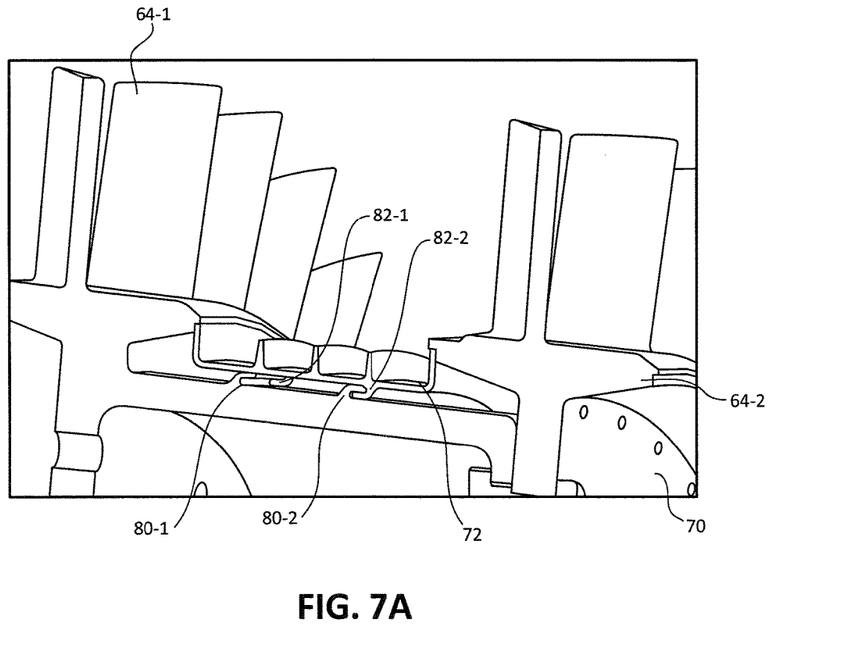
FIGS. 7A-7B illustrate a portion of a high pressure compressor comprising a thermal shield having an interlocking arm joint, in accordance with various embodiments.
Figure 7B:
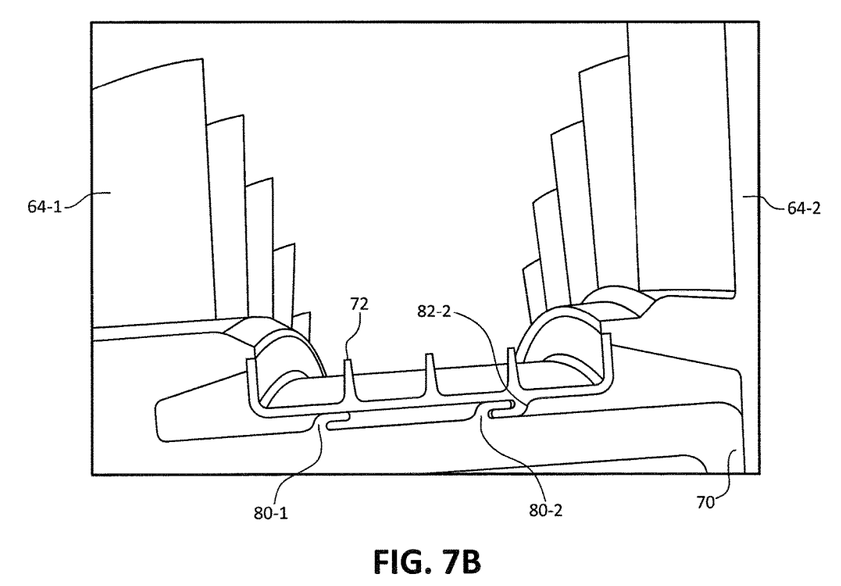

In various embodiments and with reference to FIGS. 7A-7B, rotor hub 70 may comprise a retention mechanism such as, for example, one or more first interlocking arms 80 (shown as first interlocking arm 80-1 and first interlocking arm 80-2 in FIG. 7A). First interlocking arms 80 may be disposed on a portion of an outer diameter of rotor hub 70. Thermal shield 72 may be configured with one or more second interlocking arms 82 (shown as second interlocking arm 82-1 and second interlocking arm 82-2 in FIG. 7A). In this regard, second interlocking arms 82 may be formed in the body of thermal shield 72. Second interlocking arms 82 may be disposed on a portion of an inner diameter of thermal shield 72. First interlocking arm 80 may correspond to and/or be configured to couple to second interlocking arm 82. During assembly, first interlocking arms 80 may be coupled to and/or mated to second interlocking arms 82, coupling thermal shield 72 to rotor hub 70. The coupling of first interlocking arms 80 and second interlocking arms 82 may reduce and/or minimize radial deflection of thermal shield 72 in operation (e.g., when the rotor hub is rotating). Moreover, thermal shield 72 may be axially constrained and/or sandwiched between rotor 64-1 and rotor 64-2.

In various embodiments, thermal shield 72 can be attached to rotor hub 70 by a number of techniques including, for example, welding, brazing, dovetail joints, tabs, or any other mechanical fixation method. Regardless of the fixation method, thermal shield 72 may feature thermal isolation and/or cooling passages which may be formed by features including but not limited to annular gaps, slots, holes, notches, material scallops, or any other shape of passage design.

Figure 8:
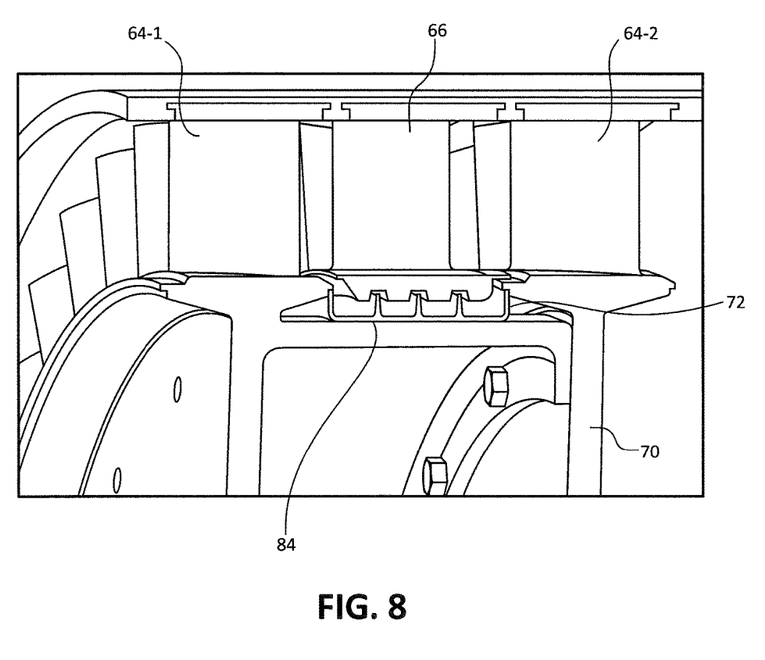
FIG. 8 illustrates a portion of a high pressure compressor comprising a thermal shield coupled to a rotor hub, in accordance with various embodiments.

In various embodiments and with reference to FIG. 8, thermal shield 72 may be mounted rigidly and/or integrally with rotor hub 70. For example, thermal shield 72 may be attached and/or couple to rotor hub 70 (e.g., welded, friction welding, stir welded, tack welded, brazed, glued and/or the like). In this regard, thermal shield 72 may be a thermal buffer zone. In various embodiments, a hybrid-material design may be used. For example, thermal shield 72 may be made of one material that has thermal shielding properties, and rotor hub 70 may be made from another material have sufficient strength and heat load tolerance capabilities for and HPC.

In various embodiments, thermal shield 72 may be retained, attached and/or mounted to rotor 64 and/or rotor hub 70 by any suitable method. For example, thermal shield 72 may be retained on rotor 64 and/or rotor hub 70 by hooks, slots, fasteners, welding, brazing, and/or the like. In this regard, the retention method may generally reduce and/or minimize radial separation of thermal shield 72 from rotor 64 and/or rotor hub 70 at high rotational speeds (e.g., during operation of the HPC).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thermal shield, comprising:
   a body portion;
   a first knife seal integrally formed in the body portion wherein the first knife seal extends into a shroud recess of a shroud opposite the thermal shield in order to minimize a shroud flow flowing through a cavity between the shroud and the thermal shield, and wherein the shroud is configured to cause the shroud flow to enter the cavity at an aft portion of the thermal shield and flow toward a forward portion of the cavity in an opposite direction of a core flow;
   a cooling flow channel formed between a rotor hub and a cavity wall, the cooling flow channel configured to allow a cooling flow to flow from the aft portion of the thermal shield to a front portion of the thermal shield;
   a retention mechanism integrally formed in the body portion at an inner diameter of the body portion opposite the first knife seal,
   wherein the retention mechanism is configured to couple the body portion to a rotor hub and
   wherein the thermal shield comprises a first material and the rotor hub comprises a second material.

2. The thermal shield of claim 1, wherein the thermal shield in installable within a high pressure compressor.

3. The thermal shield of claim 1, further comprising a plurality of knife seals.

4. The thermal shield of claim 1, wherein the retention mechanism is an interlocking arm retention mechanism.

5. The thermal shield of claim 1, wherein lateral motion of the body portion is restrained by a first rotor and a second rotor of a high pressure compressor.

6. A high pressure compressor, comprising:
   a rotor hub;
   a first rotor coupled to the rotor hub;
   a stator adjacent and aft the first rotor configured to straighten a core flow;
   a cooling flow channel formed between the rotor hub and a cavity wall, the cooling flow channel configured to allow a cooling flow to flow from an aft portion of a thermal shield to a front portion of the thermal shield;
   a second rotor adjacent and aft the stator, the second rotor coupled to the rotor hub; and
   the thermal shield coupled to the rotor hub and disposed radially inward of the stator, the thermal shield comprising a first knife seal extending into a shroud recess of a shroud to minimize a shroud flow flowing through a cavity between the shroud and the thermal shield and comprising a retention mechanism extending from an inner diameter of the thermal shield opposite the first knife seal, wherein the thermal shield comprises a first material and the rotor hub comprises a second material, and wherein the shroud is configured to cause the shroud flow to enter the cavity at the aft portion of the thermal shield and flow toward a forward portion of the cavity in an opposite direction of the core flow.

7. The high pressure compressor of claim 6, wherein the first knife seal is configured to minimize flow below the stator.

8. The high pressure compressor of claim 6, wherein the first knife seal is configured to reduce windage.

9. The high pressure compressor of claim 6, wherein the thermal shield is bonded to the rotor hub.

10. The high pressure compressor of claim 6, wherein the thermal shield is coupled to the rotor hub with an interlocking arm mechanism.

11. The high pressure compressor of claim 6, wherein the cooling flow channel is in fluid communication with a cooling port disposed in the second rotor.

12. The high pressure compressor of claim 6, wherein the cooling flow channel is configured to reduce the thermal load in the rotor hub.

13. The high pressure compressor of claim 6, wherein the first rotor and the second rotor are configured to restrain notion of the thermal shield.

14. A gas turbine engine comprising:
a high pressure turbine;
a combustor configured to drive the high pressure turbine;
a high pressure compressor operatively coupled to the high pressure turbine and capable of being driven by the high pressure turbine, the high pressure compressor, comprising,
a rotor hub;
a first rotor coupled to the rotor hub;
a second rotor adjacent and aft the first rotor;
a cooling flow channel formed between the rotor hub and a cavity wall, the cooling flow channel configured to allow a cooling flow to flow from an aft portion of a thermal shield to a front portion of the thermal shield;
the thermal shield coupled to the rotor hub and disposed between the first rotor and the second rotor, the thermal shield comprising at least a first knife seal and comprising a retention mechanism extending from an inner diameter of the thermal shield opposite the first knife seal, wherein the thermal shield comprises a first material and the rotor hub comprises a second material, wherein the first knife seal extends into a shroud recess of a shroud opposite the thermal shield in order to minimize a shroud flow flowing through a cavity between the shroud and the thermal shield, and wherein the shroud is configured to cause the shroud flow to enter the cavity at the aft portion of the thermal shield and flow toward a forward portion of the cavity in an opposite direction of a core flow.

15. The gas turbine engine of claim 14, further comprising:
a stator disposed between the first rotor and the second rotor; and
wherein the shroud flow is defined between the shroud and a cavity wall of the thermal shield; wherein the thermal shield is configured to thermally isolate the rotor hub from the shroud flow.

16. The gas turbine engine of claim 14, wherein the cooling flow channel isolates the rotor hub from the shroud flow.

* * * * *

UNITED STATES PATENT AND TRADEMARK OFFICE
CERTIFICATE OF CORRECTION

PATENT NO. : 10,036,278 B2  
APPLICATION NO. : 14/665797  
DATED : July 31, 2018  
INVENTOR(S) : Brad Powell and Chong H. Park Page 1 of 1

It is certified that error appears in the above-identified patent and that said Letters Patent is hereby corrected as shown below:

In the Claims

In Column 9, Line 9 please delete "notion" and therefore insert --motion--

Signed and Sealed this
Eighteenth Day of September, 2018

Andrei Iancu
*Director of the United States Patent and Trademark Office*